United States Patent [19]

Hari et al.

[11] Patent Number: 5,516,546
[45] Date of Patent: May 14, 1996

[54] (METH)ACRYLATE COMPOSITION FOR CONDUCTIVE FLOOR COATINGS AND A PROCESS FOR THE PREPARATION OF CONDUCTIVE FLOOR COATINGS

[75] Inventors: Siegfried Hari, Seligenstadt; Dietrich Wenk, Porta Westfalica-Barkhausen, both of Germany

[73] Assignee: Degussa Aktiengesellschaft, Frankfurt am Main, Germany

[21] Appl. No.: 248,886

[22] Filed: May 25, 1994

[30] Foreign Application Priority Data

May 25, 1993 [DE] Germany ............ 43 17 302.0

[51] Int. Cl.⁶ ............... B05D 5/12; H01H 1/22; H01H 1/24; B32B 5/16
[52] U.S. Cl. ............ 427/122; 427/372.2; 427/123; 427/445; 427/126.4; 252/510; 252/511; 252/512; 252/513; 252/514; 252/503; 252/506; 252/508; 252/515; 428/922; 428/923; 428/924; 428/925; 428/926
[58] Field of Search ............ 252/510, 511, 252/512, 513, 514, 515, 503, 506, 508; 427/372.2, 122, 123, 445, 126.4; 428/922, 923, 924, 925, 926

[56] References Cited

U.S. PATENT DOCUMENTS

| | | | |
|---|---|---|---|
| 3,056,750 | 10/1962 | Pass | 252/511 |
| 3,907,727 | 9/1975 | Lipp | 260/17 R |
| 3,983,075 | 9/1976 | Marshall et al. | 252/511 |
| 4,387,115 | 6/1983 | Kitamura et al. | 252/518 X |
| 4,508,640 | 4/1985 | Kanda et al. | 252/511 X |
| 4,515,710 | 5/1985 | Cobbledick | 252/511 |
| 4,714,569 | 12/1987 | Nishino et al. | 252/511 |
| 4,911,864 | 3/1990 | Sato et al. | 252/518 |
| 4,959,178 | 9/1990 | Frentzel | 252/514 |
| 5,068,150 | 11/1991 | Nakamura et al. | 252/512 X |
| 5,147,580 | 9/1992 | Hill | 252/518 X |
| 5,194,182 | 3/1993 | Kissel | 252/518 |

FOREIGN PATENT DOCUMENTS

| | | |
|---|---|---|
| 0563894 | 10/1993 | European Pat. Off. . |
| 0107307 | 5/1981 | Poland . |

OTHER PUBLICATIONS

Kirk–Othmer, *Encyclopedia of Chemical Technology*, 3rd ed., vol. 13, pp. 355–373 (1981). Month not known.

*Primary Examiner*—Douglas J. McGinty
*Attorney, Agent, or Firm*—Cushman, Darby & Cushman

[57] ABSTRACT

A polymerizable (meth)acrylate system which can be cured at ambient temperature to provide a conductive floor coating or shaped article. The composition comprises (meth)acrylates and optionally other monomers and other components such as pre-polymers, plasticizers, customary additives etc., in combination with amorphous or spheroidal graphite and/or carbon fibers and/or finely divided metal. Other fillers may be added. In particular, amorphous natural graphite, preferably having the particle size 20 to 1000 μm, is suitable. Coatings prepared in this way fulfill the requirements in respect of DIN 51 953.

12 Claims, 2 Drawing Sheets

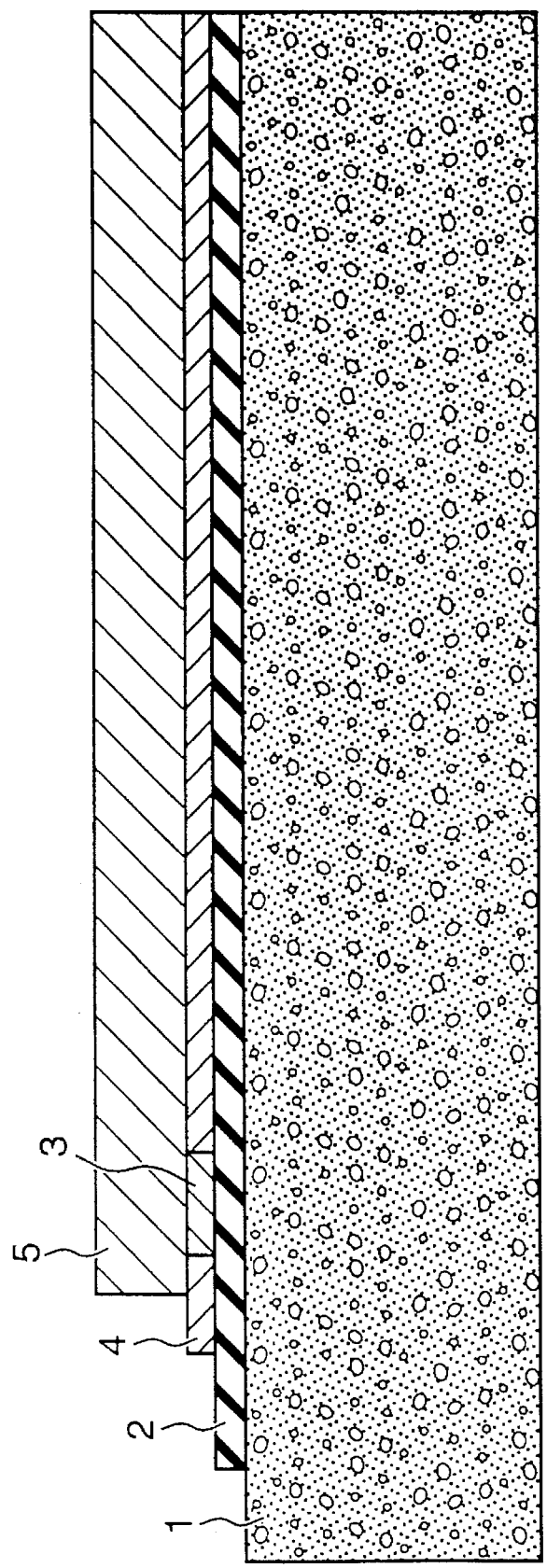

(METH)ACRYLATE COMPOSITION FOR CONDUCTIVE FLOOR COATINGS AND A PROCESS FOR THE PREPARATION OF CONDUCTIVE FLOOR COATINGS

The present invention relates to a polymerizable, cold-setting, reactive (meth)acrylate system for conductive floor coatings and to the preparation of said coatings.

BACKGROUND OF THE INVENTION

Filled methacrylate systems already are known to the prior art. The use of mixtures based on monomeric esters of methacrylic acid and fillers as casting compositions for the preparation of optionally glass fiber reinforced molded bodies and profiles is known from Published German Patent Application DE-OS-20 28 890. The mixture according to DE-OS-20 28 890 comprises essentially a) approx. 5 to approx. 50% by wt. of monomeric esters of methacrylic acid with mono- and/or polyhydric alcohols, although optionally up to approx. 20% by wt. of the methacrylic acid esters may be replaced by other, polymerizable vinyl or allyl compounds, and b) approx. 95 to approx. 50% by wt. of one or more inorganic or organic solids which are insoluble in the monomer or in the monomer mixture. The mixture may, in addition, contain minor quantities of dyes or pigments and, if necessary, polymerization accelerators. The mixture is cured, preferably with the action of known polymerization catalysts. DE-OS 20 28 890 proposes metal powder, inter alia, as a filler. For example, the use of finely divided iron powder or aluminum powder is described.

The well known casting compound is not very suitable as a floor coating because of the low proportion of monomer and the high filler content.

U.S. Pat. No. 3,907,727 discloses the use of carbon black for blacking molded bodies made from cast acrylate polymer. According to this patent, a dispersion of furnace black, acrylate polymer, methyl methacrylate monomer and a small proportion of nitrocellulose is prepared. Then, a catalyst is added to the dispersion. The dispersion is then poured into the mold and heated to at least 50° C.

In view of the addition of nitrocellulose and the relatively high temperature required for polymerization, this system is also unsuitable as a floor coating.

Filled polymer materials, e.g. mixtures of polybutyl methacrylate and CP-butyl acrylate-isobutylene which are filled with Ni powder, Al powder or graphite, are known from DKI, report no. 93040679707, 1993-04779. The Russian publication on which said abstract is based is concerned with the analysis of the elongation diagram of filled polymer materials. There is no references to floor coatings in the DKI abstract.

Published German Patent Application DE-OS 23 09 149 is concerned with polymer compositions in which the surface of a granular, inorganic substance is coated almost completely with a polymer material. Inorganic substances mentioned are, inter alia, iron sesquioxide or carbon, while monomers listed are methyl methacrylate or acrylic acid methyl ester. In an example, however, only iron sesquioxide particles are coated with pollvinyl chloride, which is polymerized at a temperature of 65° C. According to DE-OS 23 09 149, a heat-setting methacrylate system is used, while the inorganic particles mentioned are provided with a polymer coating in order to produce a better strength during pressing than, for example, dry mixtures of inorganic substances and synthetic resin would achieve.

Finally, a process for the polymerization of methyl methacrylate in the presence of graphite is known from Angewandte Chemie 53 (1976), pages 65–72. Polymerization is carried out in $SO_2$-containing water, a reaction between ash contained in graphite and $HSO_3^-$ being assumed as an initiating reaction. The aqueous redox system used in this publication does not seem to be suitable for the preparation of conductive floor coatings.

For some decades, electrically conductive floor coatings have been prepared from of epoxides, polyurethanes or polyesters. In order to achieve conductivity, conductive fillers such as carbon black, graphite or surface-treated metal powders are added to the coatings. On the other hand, when attempts have been made to base such coatings on (meth)acrylates, such additions lead to disturbances in the curing process, with the result that corresponding conductive floor coatings based on (meth)acrylate could not be produced.

The preparation of conductive, acrylic (meth)acrylate coatings was, therefore, very expensive. U.S. Pat. No. 4,714,569 describes a coating process in which graphite and carbon black are pre-polymerized in a particular ratio with (meth)acrylic acid and functionalized (meth)acrylates, the mixture is further polymerized with an azo compound at elevated temperature, and the product obtained is cured with a cross-linking agent. This process is unsuitable for coating large areas, particularly floors, because a temperature of between 80° and 90° C. over several hours was required. It is impractical to achieve such temperatures over large areas.

SUMMARY OF THE INVENTION

The object of the present invention is, therefore, to provide a polymerizable (meth)acrylate system which cures at ambient temperatures by means of a redox system and which provides conductive coatings having the desired properties.

This and other objects are achieved with a polymerizable, cold-setting, reactive (meth)acrylate system containing A a monomeric component consisting essentially of (meth)acrylate and/or other monomers, >50–100% by wt.,

| | |
|---|---|
| methyl (meth)acrylate | 0–100% by wt. |
| $C_2$–$C_4$ (meth)acrylate | 0–100% by wt. |
| $\geq C_5$ (meth)acrylate | 0–50% by wt. |
| polyhydric (meth)acrylates | 0–100% by wt. |
| and comonomers including the following: | 0–50% by wt., |
| vinyl aromatics | 0–30% by wt. |
| vinyl esters | 0–30% by wt. |

B 0–2 parts of a (pre)polymer which is soluble or capable of swelling in Component A for each part of A C 0–7 parts of a plasticizer for each 10 parts of (A+B)

D a redox system to be kept apart from the polymerizable constituents of the system until polymerization is to be carried out, at least in respect of one component of the redox system, the redox system containing an accelerator and a peroxide catalyst or initiator in a quantity sufficient for the cold-setting of component A E customary additives F conductive fillers based on the sum of A–F, the conductive filler being either amorphous or spheroidal graphite—10–40% by wt. or carbon fiber with a thickness in the region of 5–30 μm and a length in the region of 30–5000 μ— 1–10% by wt. or finely divided metal in the form of flakes, powder or granules with a maximum particle length of ≦5 mm—2–40% by wt. or a mixture of two or all of said conductive fillers, the minimum quantity of each individual conductive filler in the mixture being reduced in accordance with its proportion in the mixture of conductive fillers, and the sum of conductive fillers being limited to <50% by wt.

G other fillers, based on the sum of A–G, 0–92% by wt., where the sum of F+G is limited to ≦93% by wt. and fillers between 20 and 50 μm are limited to ≦30% by wt. and those below 20 μm to ≦10% by wt.

H solvents in an amount, based on the sum of A to E plus H, of ≦15% by wt.

The polymerizable, cold-setting, reactive (meth)acrylate system according to the invention is composed of the components A to E, which together represent the binder, the conductive fillers F and other fillers G, and, possibly, a proportion of a solvent H.

The binder (A to E) is, in turn, composed of polymerizable monomers A, optionally (pre)polymers B which are soluble or capable of swelling in said monomers, optionally plasticizer C, a redox system D, and customary additives E.

A single monomer may be used as monomer A, e.g. methyl (meth)acrylate, but a mixture is normally used. The composition of component A is:

| (meth)acrylate | >50–100% by wt. |
| methyl (meth)acrylate | 0–100% by wt. |
| $C_2$–$C_4$ (meth)acrylate | 0–100% by wt. |
| ≧$C_5$ (meth)acrylate | 0–50% by wt. |
| polyhydric (meth)acrylates | 0–100% by wt. |
| comonomers | 0–50% by wt. |
| vinyl aromatics | 0–30% by wt. |
| vinyl esters | 0–30% by wt. |

Preferably, styrene is limited to max. 20% by wt. in A because a higher content leads to disturbances during cold setting, and considerable odor problems can be expected.

In the foregoing listing, a constituent placed in parentheses stands for its optional usability, e.g., (meth)acrylate stands for acrylate and/or methacrylate. The monomer component A contains at least 50% by wt. of (meth)acrylate, monohydric (meth)acrylates with a $C_1$–$C_4$ ester group being preferred. Longer-chain esters, i.e. those with a $C_5$ or longer chain ester are limited to 50% by wt. in component A. Said esters make coatings or molded parts more flexible, but also softer, as a result of which their performance characteristics are restricted. Preferably, polyhydric (meth)acrylates are also contained in component A, and component A may also be composed completely of polyhydric (meth)acrylates.

In addition to (meth)acrylates, component A may also contain other comonomers, their proportion being limited to 50% by wt. Of said comonomers, vinyl aromatics and/or vinyl esters may be contained in each case in quantities up to 30% by wt. in component A. Higher proportions of vinyl aromatics are difficult to incorporate during polymerization and may lead to demixing of the system. Moreover, higher proportions of vinyl esters may cause the polymers to cure insufficiently at low temperatures and tend to exhibit greater shrinkage.

Preferably, component A is composed of 80–100% by wt. and in particular preference 90–100% by wt. of (meth)acrylates, since favorable performance characteristics for coatings or molded parts may be achieved with such monomers. The proportion of $C_2$–$C_4$ esters in (meth)acrylates is limited preferably to 50% by wt. in component A, said esters are contained preferably in a quantity of max. 30% by wt. and particularly advantageously in a quantity of max. 20% by wt. in component A. Similarly, the ≧$C_5$ esters of (meth)acrylic acid are limited preferably to 30% by wt. and particularly advantageously to 15% by wt. Particularly flexible and non-soiling coating compounds can be produced in this way.

Suitable monofunctional (meth)acrylates are, in particular, methyl methacrylate, butyl methacrylate, butyl acrylate, 2-ethylhexyl acrylate, triethyleneglycol methacrylate, hydoxypropyl methacrylate; in particular vinyl toluene, styrene, vinyl esters are suitable as comonomers. It is particularly advantageous to include polyfunctional (meth)acrylates in component A, their content lying normally in the range of 1 to 50% by wt. and mostly 1 to 10% by wt. in A. The polyfunctional (meth)acrylates are used for linking polymers between linear molecules. As a result, properties such as flexibility, scratch resistance, melting point or curing processes can be manipulated.

Customary polyfunctional (meth)acrylates which can be used are triethylene glycol dimethacrylate (TEDMA), trimethylolpropane trimethacrylate (TRIM) and butane-1,4-diol dimethacrylate (1,4-BDMA).

In order to adjust the viscosity of the binder and the process characteristics and to achieve better curing, a polymer or prepolymer may be added to component A. This (pre)polymer should be soluble or capable of swelling in the monomer component A. Up to 2 parts of the prepolymer B to one part of A are used. In particular, poly (meth)acrylates are suitable. Such materials may be dissolved as a solid polymer in A, or a so-called syrup may be used, i.e. partially polymerized masses of corresponding monomers. Moreover, polyvinyl chloride, polyvinyl acetate, polystyrene, epoxy resins, epoxy(meth)acrylates, unsaturated polyesters, polyurethanes or mixtures thereof are suitable. Said polymers bring about in the binder, e.g., special flexibility properties, shrinkage control, stabilizer, skin former or improved processing.

Thin coatings, i.e. those less than 5 mm, contain preferably at least 1% by wt., particularly advantageously at least 3% by wt. of a high molecular weight polymer, e.g. poly(meth)acrylate, based on the sum of A+B.

Moreover, the binder normally contains a plasticizer. Up to 7 parts of a plasticizer to 10 parts of A+B may be used. Normally, the plasticizer proportion C, in the sum of A to C, is 5–25% by wt., and mostly 10–20% by wt. The plasticizer is used, e.g., as an acceptor for peroxide components for the automatic 2-component mixing process (desensitizing agent), to control the compressive and flexural strengths and to vary the surface tension.

Suitable plasticizers are e.g. phthalic acid esters, adipic acid esters, chlorinated paraffins, urea resins, melamine resins, modified phenolates, polyglycol urethanes.

The binder (A to E) may further contain customary or conventional additives E, of the kind normally used in reactive (meth)acrylate systems. Said additives are used, e.g. to neutralize oxygen inhibitors; in particular, paraffins in a quantity of 0.05 to 5% by wt. in the binder A to E and/or phosphites in a quantity of 0.01 to 1% by wt. in A to E and also a polymer skin former (paraffin-free) may be used. For the latter, in order to achieve a non-inhibited surface without paraffin, e.g. extremely high molecular weight polymers may be used as additives, particularly if methyl methacrylate is used alone. Methyl methacrylate evaporates on the surface even during curing and leaves behind a tack-free surface due to polymer skin formation.

In addition, defoamers, wetting agents, thixotropic agents, inhibitors, dulling agents, blueing agents, UV stabilizers and polymerization chain regulators may be added.

The binder A to E according to the invention is suitable for cold setting. For example, it may contain a redox polymerization initiation system, composed of an accelerator and a peroxide catalyst or initiator. These components are added in sufficient quantity for the cold setting of component A. The accelerator is normally used in a quantity of 0.01 to 5% by wt. in A to E, particularly advantageously in a quantity of 0.5 to 1.5% by wt. In particular, amines and mercaptans are suitable as accelerators, dimethyl-p-toluidine, diisopropoxy-p-toluidine, diethanol-p-toluidine, dimethylaniline and glycol dimercaptoacetate are preferred. In addition, organic metal salts which are normally used in the range of 0.001 to 2% by wt. in A to E are used as accelerators. For example, cobalt naphthenate, copper naphthenate, cobalt oleate and copper oleate are suitable. In particular, dibenzoyl peroxide and methyl ethyl ketone peroxide are suitable as the peroxide catalyst. The peroxides are normally used in a quantity of 0.1 to 10% by wt. and in particular in a quantity of 0.5 to 5% by wt. in the binder. Of the component D, the accelerators e.g. dimethylparatoluidine may be present in the binder without polymerization taking place at ambient temperature. When the remaining constituents of component D are added, the reaction is initiated, component D normally being proportioned such that the (meth)acrylate system has a pot life of 10 min to 20 min. The (meth)acrylate system according to the invention contains, therefore, the complete component D only immediately before use; until use, component D is present only in part or not at all. In other words, until polymerization of the polymerizable constituents is to commence, the at least part of the operative redox system must be kept apart from the polymerizable monomers, although individual constituents of the redox system may be premixed with the polymerizable substances.

As constituents which are important to the invention, the (meth)acrylate system contains, as component F, one or more fillers, and, more specifically, based on the total amounts of components of A to F:

10–40% by wt. of amorphous or spheroidal graphite or

1–10% by wt. of carbon fiber with a thickness in the range of 5–30 µm and a length in the range of 30–5000 µm — or 2–40% by wt. of finely divided metal in the form of flakes, powder or granules with a maximum particle length ≦5 mm— or a mixture of two or more of said conductive fillers, the minimum quantity of each individual conductive filler in the mixture being reduced in accordance with its proportion in the mixture of conductive fillers, and the sum of the conductive fillers being limited to <50% by wt.

The amorphous or spheroidal graphite component is normally natural graphite. It is important in this connection that crystalline graphite, which normally is synthetic graphite, is not used. Only graphite whose particles are rounded is suitable for the polymerizable, cold-setting, reactive (meth)acrylate system according to the invention. Said graphite particles normally lie in a particle size range of 20≦x ≦100 µm, where x stands for the greatest particle length. The particles are normally platelets with highly rounded edges. Mostly, the graphite is used in a quantity of max. 30% by wt. and normally in a quantity of at least 20% by wt., based on the sum of A to F.

Normally, the commercially obtainable amorphous natural graphite may be used as the graphite component; in the event that poor polymerization (slow curing or none at all, tacky surface) is encountered with a particular formulation, the amorphous natural graphite can be selected with the aid of X-ray electron microscopy so that the amorphous natural graphite used has particularly rounded edges. In this way, a person skilled in the art may easily select a suitable graphite. At least 80% by wt. of the graphite used should have a maximum particle length of between 20 and 1000 µm, preferably at least 90% by wt. have a maximum particle length exceeding 20 µm. Those graphites in which less than 20% by wt. are below 20 µm and particularly less than 20% by wt. are below 32 µm on screening are particularly advantageous. The natural graphites normally have a carbon proportion of >70% by wt. and mostly a correspondingly high ash proportion. The normally mineral accompanying substances in natural graphite are not troublesome. On the contrary, they reduce the inhibiting effect of graphite.

The carbon fibers to be used according to the invention normally have a length in the region of 50 to 2000 µm and in particular preference in the region of 100 to 1000 µm. Depending on the purpose, fiber lengths below 500 µm are particularly suitable. The proportion of carbon fibers in A to F is particularly advantageously 2 to 5% by wt. and in particular 3 to 4% by wt. Such ranges are particularly advantageous in the case of coatings with (meth)acrylate systems, because long carbon fibers readily align themselves perpendicularly in said systems and thus project in a brush-like manner from the surface, on the one hand, and do not achieve the desired conductivity effect, on the other hand. The carbon fibers are used in particular for light-colored coatings, since a smaller proportion is needed than with graphite. Combinations of carbon fiber and graphite are also particularly advantageous, since inexpensive coatings with good conductivity may be prepared by this means. Moreover, metal spangles, powders and granules which preferably have a greatest particle length of ≦2 mm may be used in the conductive systems according to the present invention. Said metals in the form of flakes, powder or granules are also used in particular in cases where light-colored coatings are desired. Normally, the metal fillers are likewise used together with graphite. Copper, aluminum and chromium-nickel steel are suitable as metal fillers. It is particularly important in the case of metal fillers that they are neither anodized nor pre-treated with fatty acid or silicone oil, since metal fillers treated in this way are either incompatible with (meth)acrylic systems or do not lead to the desired conductivity. If the conductive fillers F are used in a mixture, smaller quantities of the individual components F than those stated above may be used, corresponding to the proportion in the sum F. The maximum quantity of conductive fillers is limited to 50% by wt. in the system A to F.

Apart from the conductive fillers F, the systems according to the invention normally contain other fillers, limited in the sum of A to G to 0 to 92% by wt., and the sum of F+G is limited to ≦93% by wt., and fillers between 20 and 50 µm are limited to ≦30% by wt. and those below 20 to ≦10% by wt. The particle size of fillers G is determined by screen analysis and is required for obtaining a sufficient conductivity of the cured (meth)acrylate system. If larger quantities of fillers between 20 and 50 µm and in particular below 20 µm than those stated are contained in the sum of A to G, the conductivity of the cured system will be impaired.

Mostly mineral fillers, e.g. quartz, chalk, heavy spar, silicon carbide etc. are used as fillers. The proportion of fillers between 20 and 50 µm is limited to particular advantage to 20% by wt. and in particular to 10% by wt., the proportion of fillers below 20 µm is limited in particular to 5% by wt. (in the sum of A to G). The proportion of fillers F+G in the entire system A to G is limited to 93% by wt., since with higher filler contents F+G, sufficient binder is no longer available to obtain a solid coating or body. If coatings are prepared, the proportion F+G in the sum of A to G is normally limited to max. 80% by wt., the region of 60 to 80% by wt. is particularly preferred.

Moreover, the (meth)acrylate system according to the invention may also contain one or more solvents, whose proportion in the sum of A to E+H is ≦15% by wt. and normally ≦10% by wt. For example, acetone, ethyl acetate, methyl ethyl ketone are suitable as solvent. The solvents are used in particular to adjust the viscosity of the binder, so that said binder may be mixed better with the fillers F and G. The (meth)acrylate system according to the invention is used for the preparation of conductive coatings. In particular, during the preparation of conductive floor coatings, the component F should be added in quantities such that the completely polymerized coating (or molded part) has a surface resistance (DIN 53 482) of $10^2$ to $10^9$ Ohm and/or a leakage resistance (DIN 51 953) of $10^3$ to $10^9$ Ohm. Depending on the binder used, the quantity or type of conductive fillers F required for a desired conductivity may be determined in a test series of samples with varying quantities of the desired conductive fillers F.

The present invention also provides a process for the preparation of a conductive coating, wherein the following polymerizable, cold-setting, reactive (meth)acrylate system is applied to a surface to be coated and allowed to cure:

A a monomeric component consisting essentially of (meth)acrylate and/or other monomers, >50–100% by wt,

| methyl (meth)acrylate | 0–100% by wt. |
| $C_2$–$C_4$ (meth)acrylate | 0–100% by wt. |
| ≧$C_5$ (meth)acrylate | 0–50% by wt. |
| polyhydric (meth)acrylates | 0–100% by wt. and |
| comonomers | 0–50% by wt., |
| including the following: | |
| vinyl aromatics | 0–30% by wt. |
| vinyl esters | 0–30% by wt. |

B 0–2 parts of a (pre)polymer which is soluble or capable of swelling in Component A for each part of A C 0–7 parts of a plasticizer for each 10 parts of (A+B)

D a redox system to be kept apart from the polymerizable constituents of the system until polymerization is to be carried out, at least in respect of one component of the redox system, the redox system containing an accelerator and a peroxide catalyst or initiator in a quantity sufficient for the cold-setting of component A E customary additives F conductive fillers based on the sum of A–F, the conductive filler being either
  amorphous or spheroidal graphite—10–40% by wt. or
  carbon fiber with a thickness in the region of 5–30 μm and a length in the region of 30–5000 μm—1–10% by wt. or
  finely divided metal in the form of flakes, powder or granules with a greatest particle length of ≦5 mm—2–40% by wt. or
  a mixture of two or all of said conductive fillers, the minimum quantity of each individual conductive filler in the mixture being reduced in accordance with its proportion in the mixture of conductive fillers, and the sum of conductive fillers being limited to <50% by wt.

G other fillers, based on the sum of A–G 0–92% by wt,. where the sum of F+G is limited to ≦93% by wt. and fillers between 20 and 50 μm are limited to ≦30% by wt. and those below 20 μm to ≦10% by wt.

H solvents in an amount, based on the sum of A to E plus H, of ≦15% by wt.

The process may be carried out at ambient temperature, i.e. normally at between 0° and 35° C., but also, if desired, at more extreme temperatures such as −10° to +45° C.

The conductive coatings may, in principle, be applied to all solid substrates; asphalt, asphalt concrete, bitumen screed, concrete, screed, ceramic tiles, metal (e.g. steel, aluminum) and wood are particularly suitable. Depending on the type of substrate, it is advantageous to apply a primer before the coating according to the invention. The kind of primer which can be used is known per se to the prior art in the case of coatings and has for example the following composition:

| solid epoxy resin | 30% by wt. |
| xylene | 60% by wt. |
| butanol | 10% by wt. |

Primers are described, for example, in Degadur data sheet, part 1, 2 and 3, Degussa AG, Germany.

Normally, one or more highly conductive leakage strips, fiber strands, metal foil or wires are placed on the primer in order to improve the transverse conductivity, which materials are advantageously bonded at intervals of a few meters (1 to 10 meters), preferably in a square pattern and linked to each other in an electrically conductive manner.

A main conductor is connected via an electric ground conductor to a zero potential.

It is likewise advantageous to apply a conductive lacquer to (or beneath) the ground conductor strips which is normally composed of a binder with or without solvent and conductive fillers. Said conductive lacquer is advantageously distributed evenly over the entire surface; favorable layer thicknesses are in the range of 0.05 to 0.5 mm and in particular between 0.1 and 0.2 mm. A conventional composition of the conductive lacquer contains, for example:

| a) | liquid epoxy resin (epoxy equivalent 190) | 33.0% by wt. |
| | amine hardener (aliphatic polyamine) amine number 700 and | 14.0% by wt. |
| | ethanol | 17.5% by wt. |
| | gasoline 80/110° C. b.p. | 10.5% by wt. |
| | amorphous natural graphite 32–75 μm | 25.0% by wt. |
| or | | |
| b) | reactive methacrylate syrup | 65% by wt. |
| | amorphous natural graphite 32–75 μm | 25% by wt. |
| | carbon fibers 100 μm | 5% by wt. |
| | acetone | 5% by wt. |

After the conductive lacquer has dried or cured, the conductive coating according to the invention is normally applied to said lacquer, preferably in a thickness of between 0.2 and 5 mm, particularly favorably in a thickness of between 1 and 2 mm. This is carried out, for example, by means of a trowel, doctor, drip applicator or spray gun, or with a roller or a brush.

If desired, a slip inhibitor may be applied to the conductive coating; this is carried out conveniently before curing with coarse fillers, for example, by scattering e.g. silicon carbide, quartz sand, etc. mostly with a particle size of between 0.1 and 5 mm, preferably 0.2 to 2 mm. The polymerizable, cold-setting, reactive (meth)acrylate system according to the invention may be provided in various premixes. Such premixes may contain, for example, (all details in parts by weight)

| 1) the binder without the catalyst or initiator, e.g.: | |
|---|---|
| polymethyl methacrylate, medium molecular weight | 20.2 |
| methyl methacrylate | 58.0 |
| dibutyl phthalate | 20.0 |
| dimethyl-p-toluidine | 0.5 |
| butane-1,4-diol dimethacrylate | 0.5 |
| paraffin melting point 56° C. | 0.5 |
| methyl ethyl ketone | 0.3 |
| styrene | 1.0 |
| 2) the fillers, e.g.: | |
| carbon fibers 0.4 mm | 4.0 |
| aluminum powder 0-200 μm | 33.0 |
| titanium dioxide rutile pigment | 4.0 |
| iron oxide black pigment | 2.0 |
| 3) the hardener (catalyst or initiator in desensitizing agent) e.g.: dibenzoyl peroxide 50% | 2.0 |
| or | |
| 1) reactive methacrylate resin without hardener (A–E) | 60.0 |
| 2) aluminum powder 0-100 μm | 30.0 |
| carbon fiber 100 μm | 5.0 |
| pigment powder | 5.0 |
| 3) hardener | 2.0 |
| or | |
| 1) reactive methacrylate resin (A–E) without hardener | 95.0 |
| 2) carbon fibers 400 μm | 5.0 |
| 3) hardener | 2.0 |
| or | |
| 1) reactive methacrylate resin (A–E) without hardener | 75.0 |
| 2) amorphous natural graphite 32–75 μm | 25.0 |
| 3) hardener | 2.0 |
| or | |
| 1) reactive methacrylate resin (A–E) without hardener | 77.0 |
| 2) amorphous natural graphite 32–75 μm | 10.0 |
| carbon fibers 100 μm | 3.0 |
| aluminum spangle | 10.0 |
| 3) hardener | 2.0 |
| or | |
| 1) reactive methacrylate resin (A–E) without hardener | 75.0 |
| 2) amorphous natural graphite 32–75 μm | 20.0 |
| carbon fibers 100 μm | 3.0 |
| 3) hardener | 2.0 |

The said premixes are mixed at the worksite and applied immediately; customary pot lives are 10 to 20 min at +20° C.

It was not possible hitherto to prepare conductive coatings by means of a reactive, cold-setting (meth)acrylate system, since the customary conductive fillers demix in said systems, agglomerate in an unsuitable manner and, in particular, inhibit radical polymerization. This is particularly the case with graphite or carbon black which, because of its oxygen-containing groups situated on the surface, scavenges the radicals required for polymerization. For this reason, such bodies were obtainable hitherto only by hot-setting with azo compounds. With the fillers described above, in combination with (meth)acrylates and a certain redox system for curing and in combination with other components, it is now possible to prepare the advantageous (meth)acrylate coatings which also have the desired conductive properties. Therefore, the invention also comprises the use of metal spangle with a greatest particle length of max. 5 mm for the preparation of a conductive (meth)acrylic coating, and the use of carbon fibers with a thickness of 5 to 30 μm and a length of 30 to 5000 μm for the preparation of a conductive (meth)acrylic coating and the use of metal spangle with a greatest particle length of max. 5 mm for the preparation of a conductive (meth)acrylic coating.

DETAILED DESCRIPTION OF PREFERRED EMBODIMENTS

The invention is explained in more detail below on the basis of figures and embodiments.

BRIEF DESCRIPTION OF FIGURES OF DRAWING

In the drawing,

FIG. 3 shows the structure of a conductive coating.

Figure 1:
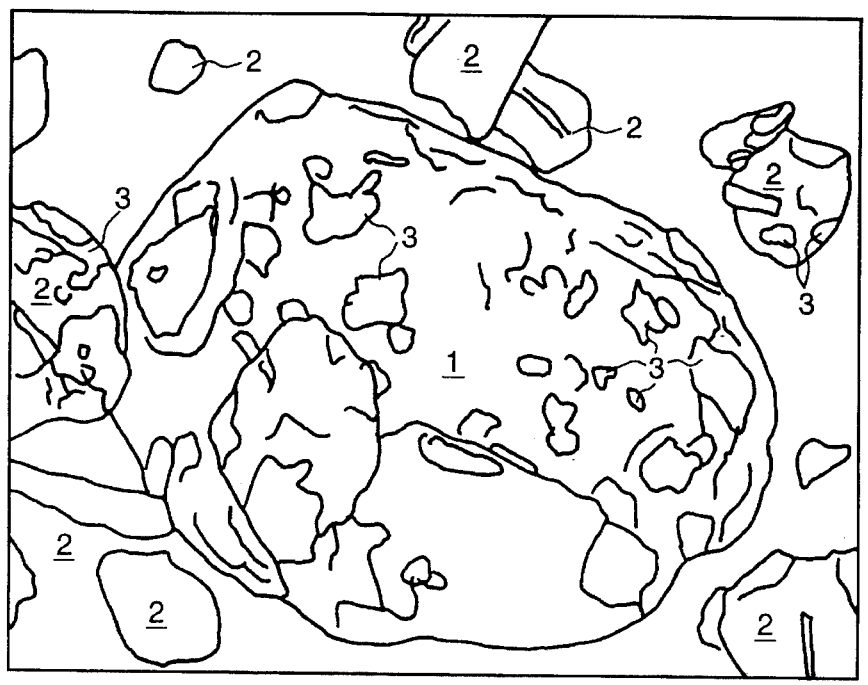
FIG. 1 shows an amorphous natural graphite.
Figure 2:
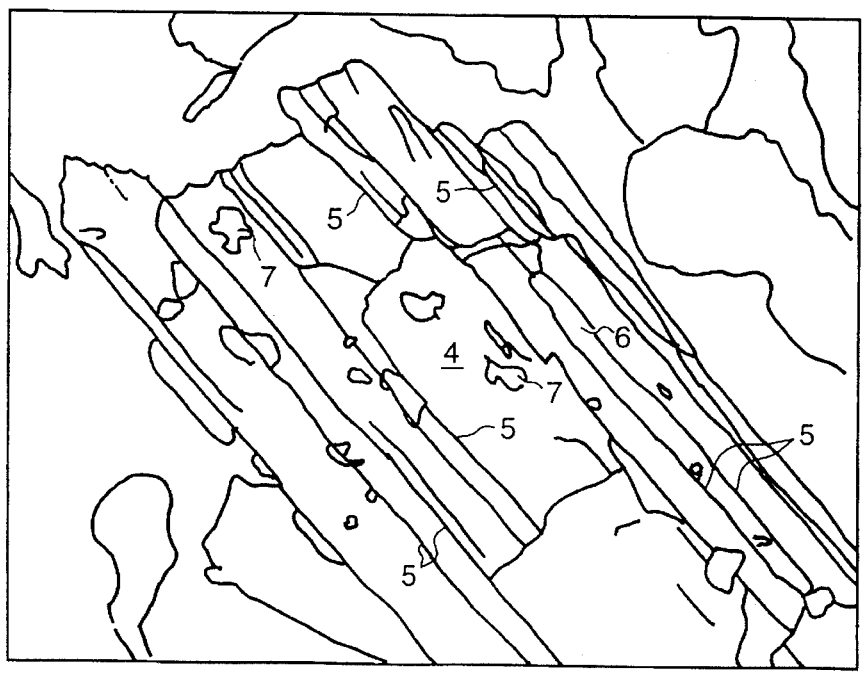
FIG. 2 shows a crystalline synthetic graphite.

FIG. 1 is a drawing of an amorphous natural graphite which was made from an REM photograph (magnification 1000, 25 kV). A large particle 1 with a maximum dimension of approx. 100 μm can be seen clearly. In addition, several smaller particles 2 with a size of ≧10 μm can be seen. Particles 1 and 2 are mostly discus-like, i.e., they are flattened and more or less rounded. The surface of particles 1 and 2 is occupied by flakes 3. Virtually no crystalline structures can be discerned. In contrast to this, FIG. 2 is a drawing of crystalline synthetic graphite, under the same conditions. A graphite crystal 4 having a columnar structure can be seen clearly. Several fracture edges 5 run over crystal 4, which all emphasize the crystalline structure of crystal 4, i.e. fragments of said crystal also have essentially the angular (flattened) column structure. A peeling, very elongated platelet 6 can be seen clearly.

The surface of the crystal is covered only by a few flakes 7, which mostly also have an angular appearance. Cold curing can not be achieved with this graphite.

FIG. 3 represents the structure of a coating according to the invention, by way of example. A primer 2 is applied to a concrete substrate 1, said primer consisting of

| | |
|---|---|
| solid epoxy resin | 30.0% by wt. |
| xylene | 60.0% by wt. |
| butanol | 10.0% by wt. | onto which, after drying, copper conductive strips 3 of thickness 0.05 mm and width 1 cm are placed. The copper conductive strips 3 are coated with a 0.2 mm thick conductive lacquer layer 4 composed of

| | |
|---|---|
| liquid epoxy resin | 33.0% by wt. |
| aliphatic polyamine | 14.0% by wt. |
| ethanol | 17.5% by wt. |
| petrol 80/110° C. boiling point | 10.5% by wt. |
| amorphous natural graphite 32–75 μm | 25.0% by wt. | onto which, after drying, a conductive coating 5 of thickness 1 to 1.5 mm and having the composition binder A–E (without catalyst)

| | |
|---|---|
| polymethyl methacrylate, medium molecular weight | 20.2 parts by wt. |
| methyl methacrylate | 57.0 parts by wt. |
| dibutyl phthalate | 20.0 parts by wt. |
| dimethyl-p-toluidine | 0.5 parts by wt. |
| butane-1,4-diol dimethacrylate | 0.5 parts by wt. |
| paraffin (56° C.) boiling point | 0.5 parts by wt. |
| methyl ethyl ketone | 0.3 parts by wt. |
| styrene | 1.0 parts by wt. |
| total conductive coating compound | |
| binder A–E as above | 67.0 parts by wt. |
| carbon fiber 0.4 mm | 3.0 parts by wt. |
| aluminum powder 0-200 · m | 25.0 parts by wt. |
| titanium dioxide rutile pigment | 3.0 parts by wt. |
| iron oxide black pigment | 2.0 parts by wt. |
| dibenzoyl peroxide 50% | 2.0 parts by wt. | is applied by means of a smoothing trowel. On this coating, the surface resistance ($R_o$) of $5.0 \times 10^6$ Ω, the ground leakage resistance ($R_E$) of $1.9 \times 10^6$ Ω and the site transition resistance ($R_{ST}$) of $2.0 \times 10^8$ Ω was determined in accordance with DIN 53 482, DIN 51 953 and VDE 0 100 and practice, Gerhard Kiefer, VDE Verlag GmbH, Berlin, page 170 ff.

What is claimed is:

1. A polymerizable, cold-setting, reactive (meth)acrylate system for conductive floor coatings containing (A) a monomeric component consisting essentially of at least one (meth)acrylate in the amount of >50–100% by wt. of said monomeric component, said (meth)acrylate selected from the group consisting of:

| methyl (meth)acrylate | 0–100% by wt. |
|---|---|
| $C_2$–$C_4$ (meth)acrylate | 0–100% by wt. |
| $C_5$ (meth)acrylate | 0–50% by wt. | and at least one comonomer in the amount of 0–<50% by wt. of said monomeric component, said comonomer selected from the group consisting of:

| vinyl aromatics | 0–30% by wt. |
|---|---|
| vinyl esters | 0–30% by wt. |

(B) 0.3–2 parts of a (pre)polymer which is soluble or capable of swelling in Component A for each part of A, wherein said prepolymer is a partially polymerized mass of monomers or a polymer selected from the group consisting of polyvinyl chloride, polyvinyl acetate, polystyrene, epoxy resins, epoxy (meth)acrylates, unsaturated polyesters, polyurethanes or mixtures thereof, (C) 0–7 parts of a plasticizer for each 10 parts of (A+B), (D) a redox system to be kept apart from at least one of any monomeric and polymeric components of the system which undergo radical polymerization, the redox system containing an accelerator and a peroxide catalyst or initiator in a quantity sufficient for the cold-setting of component A between the temperature range of −10° C. to 45° C., (E) additives, (F) conductive fillers based on the sum of Components A–F, wherein the conductive filler is selected from the group consisting of amorphous or spheroidal graphite in 10–40% by wt., carbon fiber with a thickness in the region of 5–30 μm and a length in the region of 30–5000 μm—1–10% by wt., finely divided metal in the form of flakes, powder or granules with a maximum particle length of ≦5 mm— 2–40% by wt., and a mixture of two or all of said conductive fillers, wherein the minimum quantity of each individual conductive filler in the mixture is reduced in accordance with its proportion in the mixture of conductive fillers, and the sum of conductive fillers is limited to less than 50% by wt., (G) other fillers, based on the sum of Components A–G, 0–92% by wt., where the sum of Components F+G is limited to ≦93% by wt. and fillers between 20 and 50 mm≦3% by wt. and those below 20 mm are limited to ≦10% by wt. and (H) solvents in an amount of ≦15% by wt., based on the sum of Components A to E and H.

2. A polymerizable, cold-setting, reactive (meth)acrylate system for conductive floor coatings as set forth in claim 1 in which the graphite is an amorphous natural graphite.

3. A polymerizable, cold-setting, reactive (meth)acrylate system for conductive floor coatings as set forth in claim 1 or claim 2 in which 80% by wt. of the graphite has a greatest particle length of between 20 and 1000 μm.

4. A polymerizable, cold-setting, reactive (meth)acrylate system for conductive floor coatings as set forth in claim 1 in which the carbon fiber has a linear dimension of 50 to 2000 μm.

5. A polymerizable, cold-setting, reactive (meth)acrylate system for conductive floor coatings as set forth in claim 4 in which the carbon fiber has a linear dimension of max. 1000 μm.

6. A polymerizable, cold-setting, reactive (meth)acrylate system for conductive floor coatings as set forth in claim 1 which further contains metal spangles made of copper and/or aluminum.

7. A process for the preparation of a conductive coating with a surface resistance of $10^3$ to $10^9$ Ohm and/or a leakage resistance of $10^3$ to $10^9$ Ohm, which comprises applying to a surface a polymerizable, cold-setting, reactive (meth)acrylate containing (A) a monomeric component consisting essentially of at least one (meth)acrylate in the amount of >50–100% by wt. of said monomeric component, said (meth)acrylate selected from the group consisting of:

| methyl (meth)acrylate | 0–100% by wt. |
|---|---|
| $C_2$–$C_4$ (meth)acrylate | 0–100% by wt. |
| $C_5$ (meth)acrylate | 0–50% by wt. | and at least one comonomer in the amount of 0–<50% by wt. of said monomeric component, said comonomer selected from the group consisting of:

| vinyl aromatics | 0–30% by wt. |
|---|---|
| vinyl esters | 0–30% by wt. |

(B) 0.3–2 parts of a (pre)polymer which is soluble or capable of swelling in Component A for each part of A, wherein said prepolymer is a partially polymerized mass of monomers or a polymer selected from the group consisting of polyvinyl chloride, polyvinyl acetate, polystyrene, epoxy resins, epoxy (meth)acrylates, unsaturated polyesters, polyurethanes or mixtures thereof, (C) 0–7 parts of a plasticizer for each 10 parts of (A+B), (D) a redox system to be kept apart from at least one of any monomeric and polymeric components of the system which undergo radical polymerization, the redox system containing an accelerator and a peroxide catalyst or initiator in a quantity sufficient for the cold-setting of component A between the temperature range of 10° C. to 45° C., (E) additives, (F) conductive fillers based on the sum of Components A–F, wherein the conductive filler is selected from the group consisting of amorphous or spheroidal graphite in 10–40% by wt., carbon fiber with a thickness in the region of 5–30 μm and a length in the region of 30–5000 μm—1–10% by wt., finely divided metal in the form of flakes, powder or granules with a maximum particle length of ≦5 mm— 2–40% by wt., and a mixture of two or all of said conductive fillers, wherein the minimum quantity of each individual conductive filler in the mixture is reduced in accordance with its proportion in the mixture of conductive fillers, and the sum of conductive fillers is limited to less than 50% by wt., (G) other fillers, based on the sum of Components A–G, 0–92% by wt., where the sum of Components F+G is limited to ≦93% by wt. and fillers between 20 and 50 mm≦3% by wt. and those below 20 mm are limited to ≦10% by wt. and (H) solvents in an amount of ≦15% by wt., based on the sum of Components A to E and H.

8. A process according to claim 7 in which curing takes place at ambient temperature.

9. A process for the preparation of a shaped article having a surface resistance of $10^3$ to $10^9$ Ohm and/or a leakage resistance of $10^3$ to $10^9$ Ohm which comprises curing a surface a polymerizable, cold-setting, reactive (meth)acrylate system containing (A) a monomeric component consisting essentially of at least one (meth)acrylate in the amount of >50–100% by wt. of said monomeric component, said (meth)acrylate selected from the group consisting of:

| | |
|---|---|
| methyl (meth)acrylate | 0–100% by wt. |
| $C_2$–$C_4$ (meth)acrylate | 0–100% by wt. |
| $C_5$ (meth)acrylate | 0–50% by wt. | and at least one comonomer in the amount of 0–<50% by wt. of said monomeric component, said comonomer selected from the group consisting of:

| | |
|---|---|
| vinyl aromatics | 0–30% by wt. |
| vinyl esters | 0–30% by wt. |

(B) 0.3–2 parts of a (pre)polymer which is soluble or capable of swelling in Component A for each part of A, wherein said prepolymer is a partially polymerized mass of monomers or a polymer selected from the group consisting of polyvinyl chloride, polyvinyl acetate, polystyrene, epoxy resins, epoxy (meth)acrylates, unsaturated polyesters, polyurethanes or mixtures thereof, (C) 0–7 parts of a plasticizer for each 10 parts of (A+B), (D) a redox system to be kept apart from at least one of any monomeric and polymeric components of the system which undergo radical polymerization, the redox system containing an accelerator and a peroxide catalyst or initiator in a quantity sufficient for the cold-setting of component A between the temperature range of −10° C. to 45° C., (E) additives, (F) conductive fillers based on the sum of Components A–F, wherein the conductive filler is selected from the group consisting of amorphous or spheroidal graphite in 10–40% by wt., carbon fiber with a thickness of the region of 5–30 μm and a length in the region of 30–5000 μm–1–10% by wt., finely divided metal in the form of flakes, powder or granules with a maximum particle length of ≦5 mm— 2–40% by wt., and a mixture of two or all of said conductive fillers, wherein the minimum quantity of each individual conductive filler in the mixture is reduced in accordance with its proportion in the mixture of conductive fillers, and the sum of conductive fillers is limited to less than 50% by wt., (G) other fillers, based on the sum of Components A–G, 0–92% by wt., where the sum of Components F+G is limited to ≦93% by wt. and fillers between 20 and 50 mm ≦3% by wt. and those below 20 mm are limited to ≦10% by wt. and (H) solvents in an amount of ≦15% by wt., based on the sum of Components A to E and H.

10. A process according to one of claims 7 and 9 in which amorphous or spheroidal graphite is present in component F.

11. A process according to one of claims 7 and 9 in which carbon fibers having a thickness of 5 to 30 μm and a length of 30 to 5000 μm are present in component F.

12. A process according to one of claims 7 and 9 which further contain metal spangles with a maximum particle length of max. 5 mm present in component F.

* * * * *